Patented Aug. 12, 1947

2,425,705

UNITED STATES PATENT OFFICE 2,425,705

METHOD OF REMOVING MANGANESE FROM CALCIUM

Douglas Alexander Tetu, Haley, Ontario, Canada, assignor to Dominion Magnesium Limited, Toronto, Ontario, Canada, a corporation of Ontario No Drawing. Application October 31, 1945, Serial No. 625,945. In Canada August 17, 1945

3 Claims. (Cl. 75—67)

This invention relates to the removal of manganese from calcium metal and is particularly directed to a method by which the manganese content of calcium metal may be reduced to at least as little as 0.002%.

Calcium produced by the usual methods normally contains about 0.015 to 0.030% of manganese. For some important uses this amount of manganese in calcium is objectionable and renders it unsatisfactory for such purposes.

The object of this invention is to substantially eliminate the manganese from the metal and to reduce it at least to the point where it will serve the intended purpose in one operation.

It is possible to reduce the manganese content of calcium metal by repeated distillations, with incomplete distillation in each case. Such method is expensive and gives a very low yield. For example, triple distillation only lowers the manganese content to between 0.005 and 0.009% with low recovery in each case.

It has been found that when calcium metal is melted with a small portion of aluminum, the latter appears to form a compound with the manganese in the calcium and that this compound has a vapour pressure lower than that of manganese itself. This results in a lower concentration of manganese in the vapour phase. The present method takes advantage of this apparent circumstance. Whether or not this is the correct theory underlying the separation, the method of the invention may be carried out as follows:

(1) Calcium metal may be alloyed with a portion of aluminum preferably under reduced pressure. When such an alloy is distilled the manganese content is substantially eliminated in one distillation. Various amounts of aluminum may be used. Good results have been obtained with as low as 0.1% and as high as 15%.

(2) Calcium metal may be melted with aluminum under reduced pressure using argon to prevent oxidation. At a temperature of 850° C. and at 5.0 mm. of mercury argon pressure uniform melting of the metals and distribution of the aluminum is effected. Then the pressure is reduced to 0.05 mm. or less and distillation of the calcium is effected. The manganese content of the calcium produced ranged from 0.001 to 0.002%.

As indicated the amount of aluminum used may be widely varied. For example, calcium containing 0.013% of manganese and 0.14% of aluminum when distilled gave calcium containing 0.002% manganese.

Distillation temperature of 800 to 850° C. have been used and for periods of 5 or 6 hours. Maximum recovery is obtained by using longer heating cycles. When melting the aluminum with the calcium under argon it is best to continue the melting pressure of substantially 5 mm. for say 1.5 hours.

What I claim is:

1. A method of removing manganese from calcium which comprises incorporating 0.1 to 15% of aluminum in the calcium and distilling the calcium therefrom.

2. A method of removing manganese from calcium metal which comprises melting calcium and 0.1 to 15% of aluminum under reduced pressure in the presence of argon, further reducing the pressure and distilling the calcium from the mixture.

3. A method as defined in claim 2 wherein the calcium and aluminum are melted at a temperature of 800 to 850° C. and a pressure of about 5 mm. of mercury and thereafter the pressure is reduced to about 0.05 mm. while distilling the calcium.

DOUGLAS ALEXANDER TETU.

REFERENCES CITED

The following references are of record in the file of this patent:

UNITED STATES PATENTS

| Number | Name | Date |
|---|---|---|
| 1,814,072 | Bakken | July 14, 1931 |
| 1,814,073 | Bakken | July 14, 1931 |